No. 780,045. PATENTED JAN. 17, 1905.
B. G. LAMME.
SINGLE PHASE ALTERNATING CURRENT MOTOR.
APPLICATION FILED MAY 3, 1904.
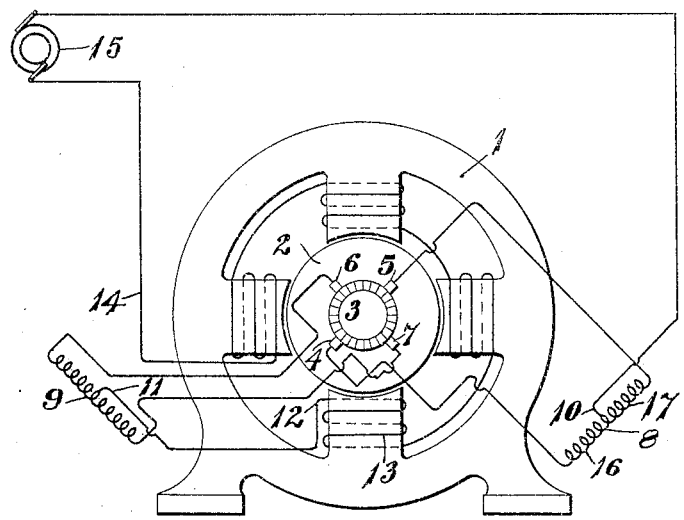
WITNESSES:
Fred. H. Miller.
Otto S. Schairer.
INVENTOR
Benjamin G. Lamme
BY
Keley G. Carr
ATTORNEY No. 780,045.                                              Patented January 17, 1905.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

SINGLE-PHASE ALTERNATING-CURRENT MOTOR.

SPECIFICATION forming part of Letters Patent No. 780,045, dated January 17, 1905.

Application filed May 3, 1904. Serial No. 206,183.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Single-Phase Alternating-Current Motors, of which the following is a specification.

My invention relates to multipolar electrical machines provided with commutators, and has particular reference to motors of this general class which are operated by alternating currents.

My invention has for its object to provide means for equalizing the potential between brushes of like polarity in multipolar alternating-current machines having commutators and multiple-wound armatures similar to those employed in direct-current motors.

Unequal division of the current between brushes of like polarity in multipolar motors having parallel-wound armatures may be due to a variety of causes, such as differences in brush resistances and unequal magnetization of the field-magnet pole-pieces. Such unequal division of current is avoided in direct-current motors by connecting together points in the armature-windings which at any instant occupy corresponding positions with reference to the field-magnet pole-pieces or which are normally of equal potential.

My invention provides simple means for equalizing the potential between brushes of like polarity in alternating-current motors, which operate satisfactorily regardless of the exact equality of potentials in the windings or the resistances of the brushes and is illustrated in the accompanying drawing, the single figure of which is a diagrammatic view of a motor constructed in accordance therewith.

The motor 1 is in most respects similar to ordinary direct-current motors, but certain parts thereof are so proportioned and arranged that the motor is adapted for satisfactory operation by means of alternating currents. The armature 2 is provided with parallel windings of a well-known type, and the proper points in the winding are connected in the usual manner to the bars of a commutator-cylinder 3, upon which brushes 4, 5, 6, and 7 bear. Brushes 4 and 5 are of like polarity, and brushes 6 and 7 are also of like polarity, but at any instant are of opposite polarity to brushes 4 and 5.

The terminals of a suitable inductive winding 8, such as a transformer or choke-coil winding, are connected, respectively, to brushes 4 and 5, and the terminals of a similar winding, 9, are connected, respectively, to the brushes 6 and 7. Leads 10 and 11 are connected, respectively, to the middle points of the windings 8 and 9 and constitute the armature-terminal leads, which may be connected to any suitable source of alternating current or to other windings of the motor, as may be desired.

I have found it expedient to connect the armature and field-magnet windings of the motor 1 in series, and for that reason I have shown the lead 11 as connected to one terminal, 12, of the field-magnet winding 13, the other terminal, 14, of that winding constituting one terminal of the motor and lead 10 constituting the other terminal of the motor, the said two motor-terminals being connected to any suitable source 15.

In the normal operation of the motor equal amounts of current would be supplied to the brushes 4 and 5 through the halves of the winding 8, the portion supplied to the brush 4 passing through the portion 16 and the current supplied to the brush 5 passing through the portion 17 of such winding. If, however, the resistance of the brush 5 is greater than that of the brush 4, a greater current will pass through the portion 16 of the winding 8, which acts inductively upon the portion 17 and tends to cause that portion to carry the same amount of current that is carried by the portion 16. Similarly, if the portion 17 carries a greater amount of current than the portion 16 there is a tendency to equalization, due to the inductive effect of the portion 17 upon the portion 16.

While I have described my invention as particularly applicable to alternating-current motors provided with commutators, I desire to include within its scope all electrical machines to which it may be applied, whatever may be the specific structure of such machines or the service in which they may be used.

I claim as my invention—

1. In an alternating-current electric machine having a multiple-wound armature, the combination with a commutator, of means for equalizing the potential between commutator-brushes of like polarity.

2. In an alternating-current electric machine having a multiple-wound armature, the combination with a commutator, of means for equalizing the potential between commutator-brushes of like polarity comprising inductive windings connected between the said brushes, and leads from the middle points thereof which serve as the terminals of the armature-winding.

3. In an alternating-current electric machine having a multiple-wound armature, the combination with a commutator, of inductive windings connected between commutator-brushes of like polarity and having leads connected to the middle points thereof.

4. The combination with a source of supply of alternating-current energy, of an electrical machine having a field-magnet winding, a multiple-wound armature, a commutator, and inductive windings connected between commutator-brushes of like polarity and having leads connecting the middle points thereof with said source of energy and the field-magnet windings respectively.

In testimony whereof I have hereunto subscribed my name this 13th day of April, 1904.

BENJ. G. LAMME.

Witnesses:
   E. M. STEWART,
   BIRNEY HINES.